United States Patent
Ren et al.

(10) Patent No.: US 10,409,051 B2
(45) Date of Patent: Sep. 10, 2019

(54) EXTRACTION OF MICROSCOPE ZOOM LEVEL USING OBJECT TRACKING

(71) Applicant: Novartis AG, Basel (CH)

(72) Inventors: Hugang Ren, Cypress, CA (US); Lingfeng Yu, Rancho Santa Margarita, CA (US); Tammo Heeren, Aliso Viejo, CA (US)

(73) Assignee: Novartis AG (CH)

( * ) Notice: Subject to any disclaimer, the term of this patent is extended or adjusted under 35 U.S.C. 154(b) by 134 days.

(21) Appl. No.: 15/643,170

(22) Filed: Jul. 6, 2017

(65) Prior Publication Data
US 2018/0039060 A1 Feb. 8, 2018

Related U.S. Application Data

(60) Provisional application No. 62/370,159, filed on Aug. 2, 2016.

(51) Int. Cl.
G06K 9/00 (2006.01)
G02B 21/36 (2006.01)
G06K 9/62 (2006.01)
G02B 21/02 (2006.01)
G06T 7/60 (2017.01)
G06K 9/46 (2006.01)
G02B 21/00 (2006.01)
G06T 7/80 (2017.01)

(52) U.S. Cl.
CPC ....... G02B 21/367 (2013.01); G02B 21/0012 (2013.01); G02B 21/025 (2013.01); G06K 9/46 (2013.01); G06K 9/6202 (2013.01); G06K 9/6215 (2013.01); G06T 7/60 (2013.01); G06T 7/80 (2017.01); G06T 2207/10016 (2013.01); G06T 2207/10056 (2013.01); G06T 2207/30041 (2013.01)

(58) Field of Classification Search
CPC G02B 21/367; G02B 21/025; G02B 21/0012; G06T 7/80; G06T 7/60; G06T 2207/10016; G06T 2207/10056; G06T 2207/30041; G06K 9/46; G06K 9/6202; G06K 9/6215
See application file for complete search history.

(56) References Cited

U.S. PATENT DOCUMENTS

| 6,678,090 B2 * | 1/2004 | Spink ................ G02B 21/0012 359/377 |
| 7,596,249 B2 * | 9/2009 | Bacus ................ G02B 21/367 382/128 |
| 2007/0031026 A1 * | 2/2007 | Kurihara ................ G06T 7/001 382/149 |
| 2014/0169637 A1 * | 6/2014 | Zuest ....................... G01B 9/04 382/106 |
| 2015/0173644 A1 | 6/2015 | Hugang et al. |
| 2016/0260218 A1 * | 9/2016 | Zweig ....................... G06T 7/80 |

* cited by examiner

Primary Examiner — Shefali D Goradia
(74) Attorney, Agent, or Firm — Keiko Ichiye, Esq.

(57) ABSTRACT

A method and system for extracting the zoom level of a microscope is disclosed. The method includes capturing a reference image; recording a first zoom level corresponding to a first magnification at which the reference image is captured; capturing a second image; determining a second zoom level by comparing the second image and the reference image, the second zoom level corresponding to a second magnification at which the second image is captured; and recording the second zoom level at a location accessible by a microscope application.

18 Claims, 6 Drawing Sheets

EXTRACTION OF MICROSCOPE ZOOM LEVEL USING OBJECT TRACKING

TECHNICAL FIELD

The present invention generally relates to optical microscopes and, in particular, to systems and methods for extracting the microscope zoom level using object tracking.

BACKGROUND

Optical microscopes are used in a variety of applications to provide the user with an enlarged picture of a specimen in the field of view of the microscope. For example, microscopes may be used in surgical, laboratory, and quality assurance applications. Optical microscopes use visible light and a system of lenses to magnify the specimen. Many microscopes can be adjusted across a range of zoom levels during use.

SUMMARY OF THE INVENTION

In accordance with some embodiments of the present disclosure, a method for extracting the zoom level of a microscope is disclosed. The method includes capturing a reference image; recording a first zoom level corresponding to a first magnification at which the reference image is captured; capturing a second image; determining a second zoom level by comparing the second image and the reference image, the second zoom level corresponding to a second magnification at which the second image is captured; and recording the second zoom level at a location accessible by a microscope application.

In accordance with another embodiment of the present disclosure, a system for extracting the zoom level of a microscope is disclosed. The system includes a processor; a non-transitory machine-readable medium communicatively coupled to the processor; and instructions stored on the non-transitory machine-readable medium. The instructions, when loaded and executed by the processor, cause the processor to capture a reference image; record a first zoom level corresponding to a first magnification at which the reference image is captured; capture a second image; determine a second zoom level by comparing the second image and the reference image, the second zoom level corresponding to a second magnification at which the second image is captured; and record the second zoom level at a location accessible by a microscope application.

In accordance with a further embodiment of the present disclosure, a microscope is disclosed. The microscope includes an eyepiece; an objective lens optically coupled to the eyepiece; and a zoom level extraction system for extracting the zoom level of the objective lens. The zoom level extraction system includes a processor; a non-transitory machine-readable medium communicatively coupled to the processor; and instructions stored on the non-transitory machine-readable medium. The instructions, when loaded and executed by the processor, cause the processor to capture a reference image; record a first zoom level corresponding to a first magnification at which the reference image is captured; capture a second image; determine a second zoom level by comparing the second image and the reference image, the second zoom level corresponding to a second magnification at which the second image is captured; and record the second zoom level at a location accessible by a microscope application.

BRIEF DESCRIPTION OF THE DRAWING

For a more complete understanding of the present disclosure and its features and advantages, reference is now made to the following description, taken in conjunction with the accompanying drawings, in which.

DETAILED DESCRIPTION

The present disclosure provides an optical microscope with a zoom level extraction system, allowing the current zoom level of the microscope to be determined and provided to a microscope application. Providing the current zoom level of the microscope to a microscope application may allow the microscope application to more accurately provide information to the user of the microscope.

A further description of the embodiments of the optical microscope, components thereof, and methods of its uses is presented with reference to FIGS. 1 through 5.

Figure 1:
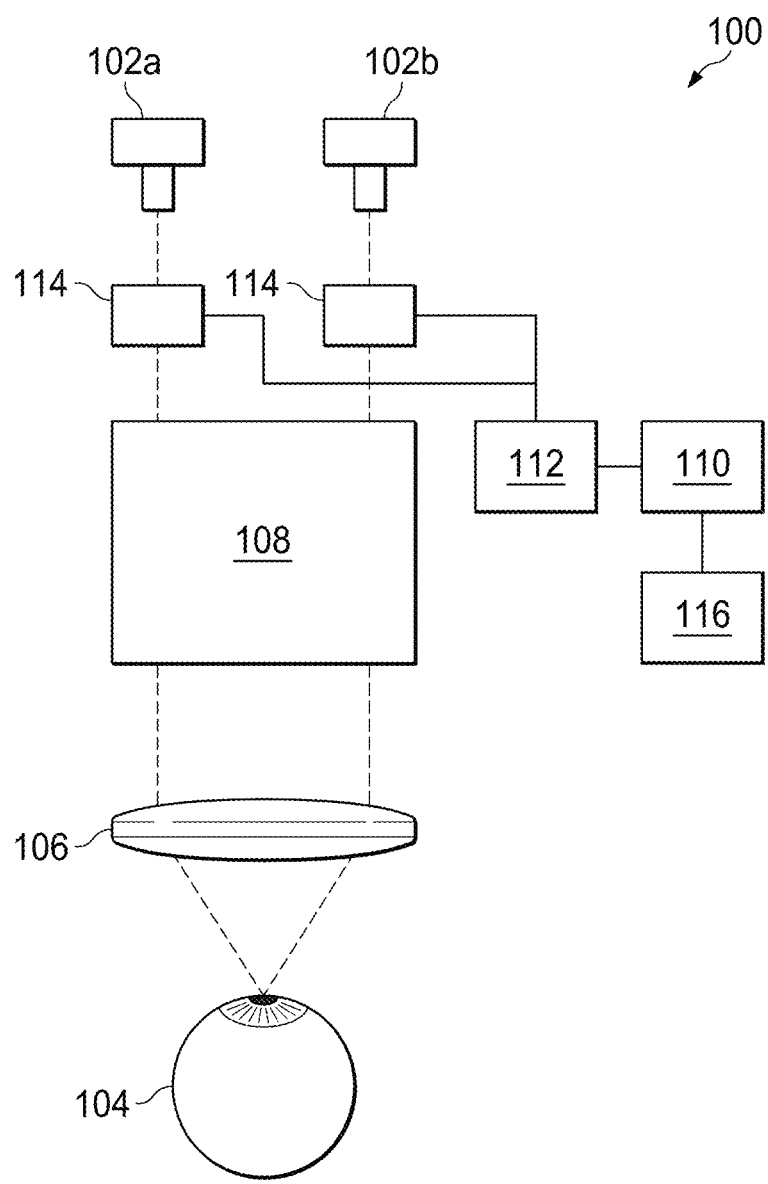
FIG. 1 is a schematic view of a microscope including a zoom level extraction system.

FIG. 1 is a schematic view of a microscope including a zoom level extraction system. Microscope 100 includes eyepieces 102a and 102b. The user of the microscope views a magnified image of specimen 104 through eyepieces 102. Specimen 104 is shown in FIG. 1 as an eye, but may be any specimen viewed using microscope 100. Eyepieces 102a and 102b may also be replaced with other components that provide a stereoscopic view of specimen 104, such as two digital displays or one three dimensional (3D) display.

The image of specimen 104 is magnified through the series of objective lens 106 and zoom lens system 108. Objective lens 106 collects light from specimen 104 and focuses the light to produce an image at eyepieces 102. Objective lens 106 may provide magnification and have a long focal length. While objective lens 106 is shown in FIG. 1 as a single lens, objective lens 106 may be a single lens or a multi-element compound lens.

Zoom lens system 108 may include one or more lenses arranged relative to one another to change the zoom level of microscope 100 during use. For example, one or more lenses in zoom lens system 108 may be moved to change the magnification of the image of specimen 104 that appears at eyepieces 102.

Microscope 100 may additionally include zoom level extraction system 110. Zoom level extraction system 110 may include a processor, a memory, and one or more applications used to calculate the current zoom level of microscope 100. Image sensor 112 may be coupled to beam splitters 114 to allow image sensor 112 to capture images of specimen 104 as the zoom level of microscope 100 is changed using zoom system 108. The processor of zoom level extraction system 110 may execute a software program that determines the zoom level of microscope 100 based on comparing a current image of specimen 104, as captured by image sensor 112, to a reference image of specimen 104, as described in more detail in FIG. 3. Once the processor determines the current zoom level of microscope 100, zoom level extraction system 110 may send the current zoom level to microscope application 116. Microscope application 116 may be an application used to aid the user of microscope 100. For example, microscope application 116 may be a tool tracking application, a digital aiming beam application, a heads-up display application, and/or an adaptive scan optical coherence topography (OCT) application. Microscope application 116 may use the current zoom level for a variety of purposes including calibration, updating an aiming beam, providing tool location and/or orientation information, and/or adjusting an OCT scanning range.

Figure 2:
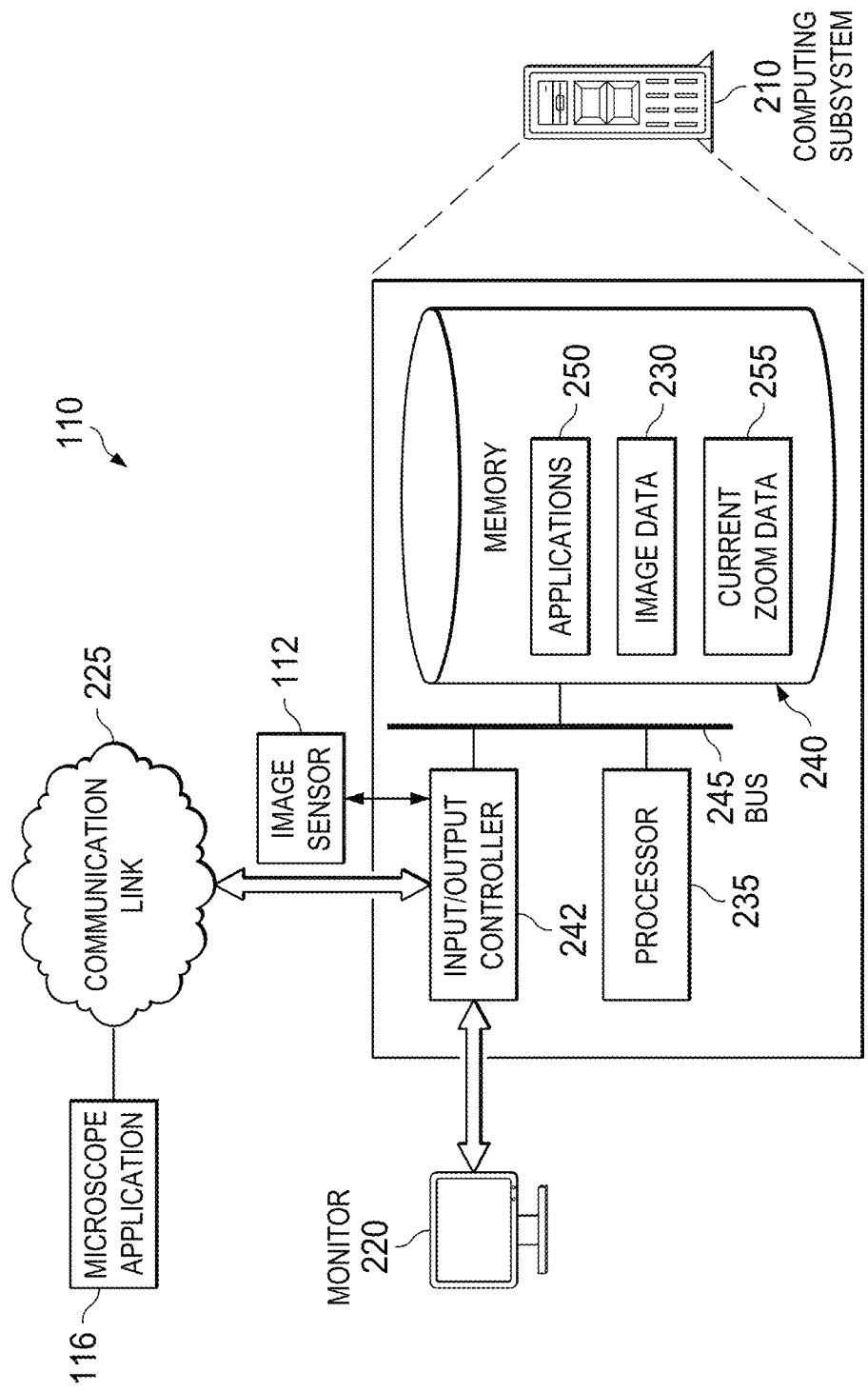
FIG. 2 is a block diagram of a zoom level extraction system shown in FIG. 1.

FIG. 2 is a block diagram of a zoom level extraction system shown in FIG. 1. Zoom level extraction system 110 may include computing subsystem 210, image sensor 112, monitor 220, and communication link 225. Image sensor 112 may capture images of a specimen in the field of view of the microscope, such as specimen 104 shown in FIG. 1. Image sensor 112 may then transmit the images to computing subsystem 210 for storage as image data 230 as discussed in further detail below. Image sensor 112 may be any electronic device able to convert light to a digital image. For instance, it may be a digital camera, a light-to-digital sensor, a semiconductor charge-coupled device (CCD), a complementary metal-oxide-semiconductor (CMOS) device, an N-type metal-oxide-semiconductor (NMOS) device, or another electronic device containing an array of photodiodes as part of one or more integrated circuits. Image sensor 112 may contain additional lenses or other elements to assist with image capture. Image sensor 112 produces a digital image with sufficient resolution to produce a usable corrected image, even after image processing.

All or part of computing subsystem 210 may operate as a component of or independent of microscope 100 or independent of any other components shown in FIG. 1. Computing subsystem 210 may include processor 235, memory 240, and input/output controllers 242 communicatively coupled by bus 245. Processor 235 may include hardware for executing instructions, such as those making up a computer program, such as application 250. As an example and not by way of limitation, to execute instructions, processor 235 may retrieve (or fetch) the instructions from an internal register, an internal cache, and/or memory 240; decode and execute them; and then write one or more results to an internal register, an internal cache, and/or memory 240. This disclosure contemplates processor 235 including any suitable number of any suitable internal registers, where appropriate. Where appropriate, processor 235 may include one or more arithmetic logic units (ALUs); be a multi-core processor; or include one or more processors 235. Although this disclosure describes and illustrates a particular processor, this disclosure contemplates any suitable processor.

Processor 235 may execute instructions, for example, to determine the current zoom level of a microscope. For example, processor 235 may run application 250 by executing or interpreting software, scripts, programs, functions, executables, or other modules contained in application 250. Processor 235 may perform one or more operations related to FIGS. 3 and 5. Input data received by processor 235 or output data generated by processor 235 may include image data 230 and current zoom data 255.

Memory 240 may include, for example, random access memory (RAM), a storage device (e.g., a writable read-only memory (ROM) or others), a hard disk, a solid state storage device, or another type of storage medium. Computing subsystem 210 may be preprogrammed or it may be programmed (and reprogrammed) by loading a program from another source (e.g., from a CD-ROM, from another computer device through a data network, or in another manner).

Input/output controller 242 may be coupled to input/output devices (e.g., monitor 220, image sensor 112, a mouse, a keyboard, or other input/output devices) and to communication link 225. The input/output devices may receive and transmit data in analog or digital form over communication link 225.

Memory 240 may store instructions (e.g., computer code) associated with an operating system, computer applications, and other resources. Memory 240 may also store application data and data objects that may be interpreted by one or more applications or virtual machines running on computing subsystem 210. For example, image data 230, current zoom data 255, and applications 250 may be stored in memory 240. In some implementations, a memory of a computing device may include additional or different data, applications, models, or other information.

Image data 230 may include information related to images captured by image sensor 112 that may be used to determine the current zoom level of the microscope. Current zoom data 255 may include information related to the current zoom level of a microscope. Current zoom data 255 may be calculated based on images in image data 230 such that computing subsystem can determine the zoom level for each captured image. Values from image data 230 and current zoom data 255 may be communicated to microscope application 116 via communications link 225.

Applications 250 may include software applications, scripts, programs, functions, executables, or other modules that may be interpreted or executed by processor 235. Applications 250 may include machine-readable instructions for performing one or more operations related to FIGS. 3 and 5. Applications 250 may include machine-readable instructions for calculating the current zoom level of a microscope. For example, applications 250 may be configured to analyze image data 230 to determine the current zoom level of a microscope and store the current zoom level in current zoom data 255. Applications 250 may generate output data and store output data in memory 240, in another local medium, or in one or more remote devices (e.g., by sending output data via communication link 225).

Communication link 225 may include any type of communication channel, connector, data communication network, or other link. For example, communication link 225 may include a wireless or a wired network, a Local Area Network (LAN), a Wide Area Network (WAN), a private network, a public network (such as the Internet), a wireless network, a network that includes a satellite link, a serial link, a wireless link (e.g., infrared, radio frequency, or others), a parallel link, a universal serial bus (USB) link, or another type of data communication network.

Image sensor 112 may record one or more images at various zoom levels of the microscope during use. The images may be stored in image data 230. Processor 235 may then execute application 250 to determine the zoom level corresponding to an image in image data 230. Once application 250 identifies the zoom level, application 250 may output and store the zoom level to current zoom data 255. Processor 235 may then output current zoom data 255 to microscope application 116 via communications link 225.

Microscope application 116 may be an application used during the use of the microscope to aid the user, such as the applications described with reference to microscope application 116 in FIG. 1. For example, microscope application 116 may be a tool tracking application that determines the location and/or orientation of a tool the user is using in conjunction with the microscope. The tool information is input into a control system to move the OCT scanner to a location corresponding to the location of the tool. The tool information is obtained from an image from image sensor 112 and is based on the pixels of the image. To move the OCT scanner to the location of the tool, microscope application 116 translates the pixel data into voltage data to determine the voltage to input into the OCT scanner to cause the OCT scanner to move. As the zoom level of the microscope changes, the translation between the pixel data and the voltage data changes. Thus, microscope application 116 may use current zoom data 255 to perform dynamic calibration to convert the tool tracking information from the pixel domain to the voltage domain. While microscope application 116 is shown in FIG. 2 as an application separate from computing subsystem 210, microscope application 116 may be stored on memory 240 and executed by processor 235.

Figure 3:
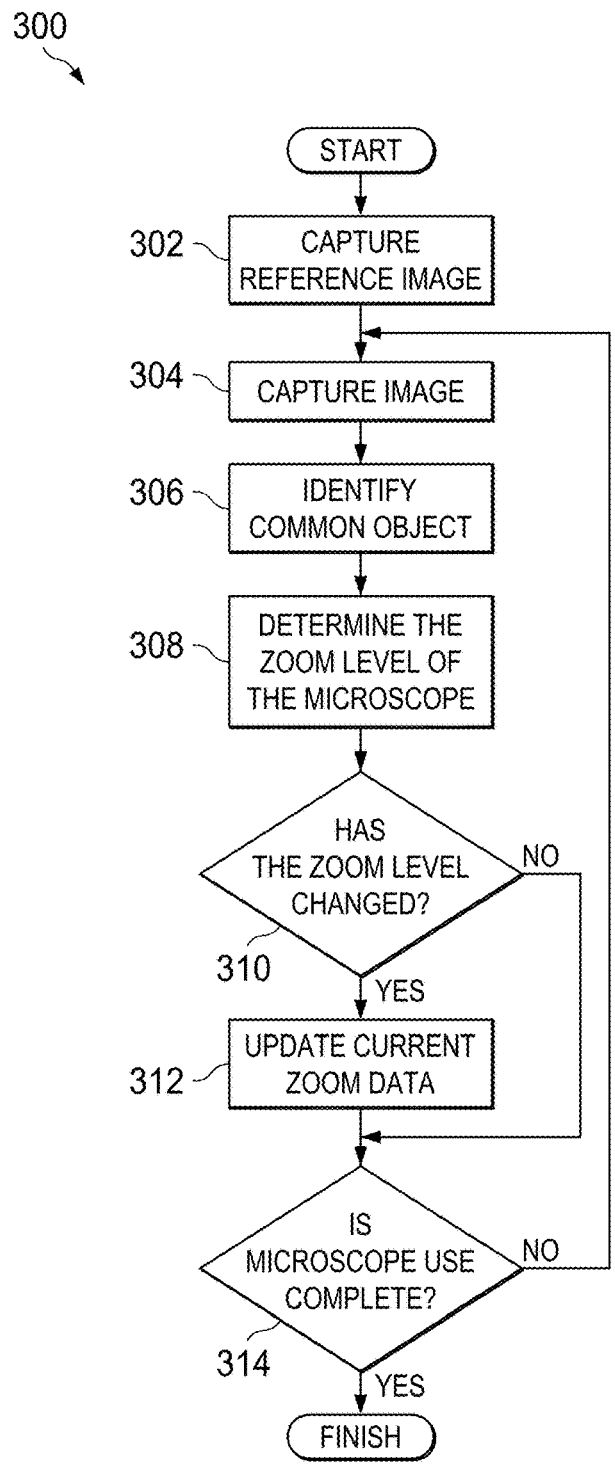
FIG. 3 is a flow chart of a method of determining the current zoom level of a microscope.

FIG. 3 is a flow chart of a method of determining the current zoom level of a microscope. The steps of method 300 may be performed by a person, various computer programs, models or any combination thereof, configured to control and analyze information from microscope systems, apparatuses and devices. The programs and models may include instructions stored on a computer readable medium and operable to perform, when executed, one or more of the steps described below. The computer readable media may include any system, apparatus or device configured to store and retrieve programs or instructions such as a hard disk drive, a compact disc, flash memory or any other suitable device. The programs and models may be configured to direct a processor or other suitable unit to retrieve and execute the instructions from the computer readable media. For example, the programs and models may be one of the applications in applications 250 shown in FIG. 2. For illustrative purposes, method 300 is described with respect to microscope 100 illustrated in FIG. 1; however, method 300 may be used to determine the current zoom level of any suitable microscope.

Method 300 may begin at step 302 where the zoom level extraction system may capture a reference image using a camera, such as image sensor 112 shown in FIG. 1. The zoom level extraction system may record the zoom level at which the reference image is captured by prompting the user to enter the current zoom level when the reference image is captured. The zoom level extraction system may capture the reference image at a predetermined zoom level each time the microscope is operated. For example, the zoom level extraction system may command the microscope to set the zoom level at 20 times magnification and capture the reference image at that zoom level. The zoom level extraction system may store the captured image and corresponding zoom level in memory, such as memory 240 shown in FIG. 2. Additionally, the zoom level extraction system may store the reference image in image data 230 shown in FIG. 2. Further, the zoom level extraction system may store the corresponding zoom level as the current zoom level in current zoom data 255 shown in FIG. 2. The zoom level extraction system may capture any number of reference images. For example, the zoom level extraction system may capture reference images at zoom levels of 5, 20, 50, and 100 times magnification. Multiple reference images may allow the zoom level extraction system to compare a captured image, as captured in step 304, to multiple reference images to improve the zoom level calculation, as described in further detail with respect to step 308.

At step 304, the zoom level extraction system may capture an image while the microscope is used. The zoom level extraction system may use the camera to periodically capture images while the user is operating the microscope. For example, the zoom level extraction system may capture an image every 30 seconds or every minute. The sample rate of image capture may change based on any suitable factor including the type of use of the microscope (e.g., a use requiring frequent zoom level changes may result in more frequent image capture), and/or the processing power of the zoom level extraction system (e.g., a system with more processing power may process a higher volume of captured images allowing more frequent image capture), and/or the latency requirement of microscope application 250 (for example, an application with a high latency requirement may require a more frequent image capture).

At step 306, the zoom level extraction system may identify a common object in both the reference image and the captured image. The common object is an object that can be identified in both images. The common object may be any feature visible in both images and may be easily identifiable. For example, the common object may be a feature that appears in both images with high contrast between the common object and the surrounding portions of the image and/or may be a feature of the image that has details that allow the zoom level extraction system to measure properties of the common object, such as the length, width, or diameter of the object.

At step 308, the zoom level extraction system may determine the zoom level of the microscope at which the image was captured in step 304. The zoom level extraction system may determine the zoom level of the captured image by comparing the captured image to the reference image. The comparison between the two images may be based on identifying a common object in each image, measuring the size of the common object in each image, and comparing the size of the common object to determine the magnification difference. For example, the zoom level extraction system may use the following formula to calculate the zoom level of the captured image:

$$Z_2 = \left(\frac{S_2}{S_1}\right) Z_1 \quad (1)$$

where
$Z_1$=zoom level of reference image;
$Z_2$=zoom level of captured image;
$S_1$=size of common object in reference image; and
$S_2$=size of common object in captured image.

Where the zoom level extraction system captures multiple reference images, the zoom level extraction system may use Equation 1 to calculate the zoom level of the captured image with respect to each reference image. The zoom level extraction system may then average the multiple calculated zoom levels of the captured image to determine the zoom level of the captured image. The zoom level extraction system may also use the median value or other statistical value (e.g., 49% percentile, 51% percentile) of the multiple calculated zoom levels of the captured image to determine the zoom level of the captured image. When using multiple reference images, the zoom level extraction system may select the zoom level of the reference image based on the comparison of the reference image with the closest zoom level. For example, the zoom level extraction system may identify one of the reference images where the size of the common object is closest to the size of the common object in the captured image. The zoom level extraction system may then use the identified reference image to calculate the zoom level of the captured image. Moreover, the zoom level extraction system may perform a weighted average calculation of the multiple calculated zoom levels of the captured image based on the size difference of the common object between captured image and the reference images. Additionally, the zoom level extraction system may use the captured image and the calculated zoom level as reference images for future calculations. An example of a comparison of the size of the common object is discussed in further detail with respect to FIGS. 4A-4C.

At step 310, the zoom level extraction system may determine whether the zoom level has changed since the last time the zoom level was calculated. The zoom level extraction system may make this determination by comparing the zoom level calculated in step 308 with the zoom level stored in the current zoom data, such as current zoom data 255 shown in FIG. 2. If the zoom level calculated in step 308 is the same as the current zoom data, method 300 may proceed to step 314 to determine if microscope use is complete. If the zoom level calculated in step 308 is different from the current zoom data, method 300 may proceed to step 312.

At step 312, the zoom level extraction system may store the zoom level calculated in step 308 as the current zoom data. The current zoom data may be stored in a database, such as current zoom data 255 shown in FIG. 2.

At step 314, the zoom level extraction system may determine if microscope use is complete. If microscope use is not complete, method 300 may return to step 304 to capture the next image. If microscope use is complete, method 300 may be complete.

Modifications, additions, or omissions may be made to method 300 without departing from the scope of the present disclosure. For example, the order of the steps may be performed in a different manner than that described and some steps may be performed at the same time. Additionally, each individual step may include additional steps without departing from the scope of the present disclosure.

Figure 4A:
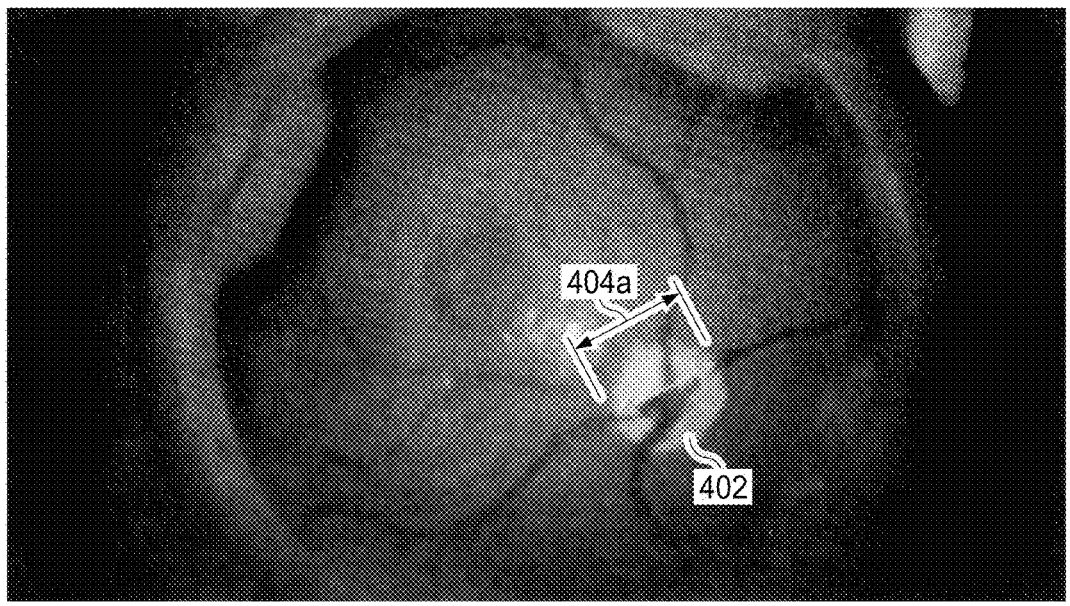
FIGS. 4A-4C are images of an eye at different magnifications.
Figure 4B:
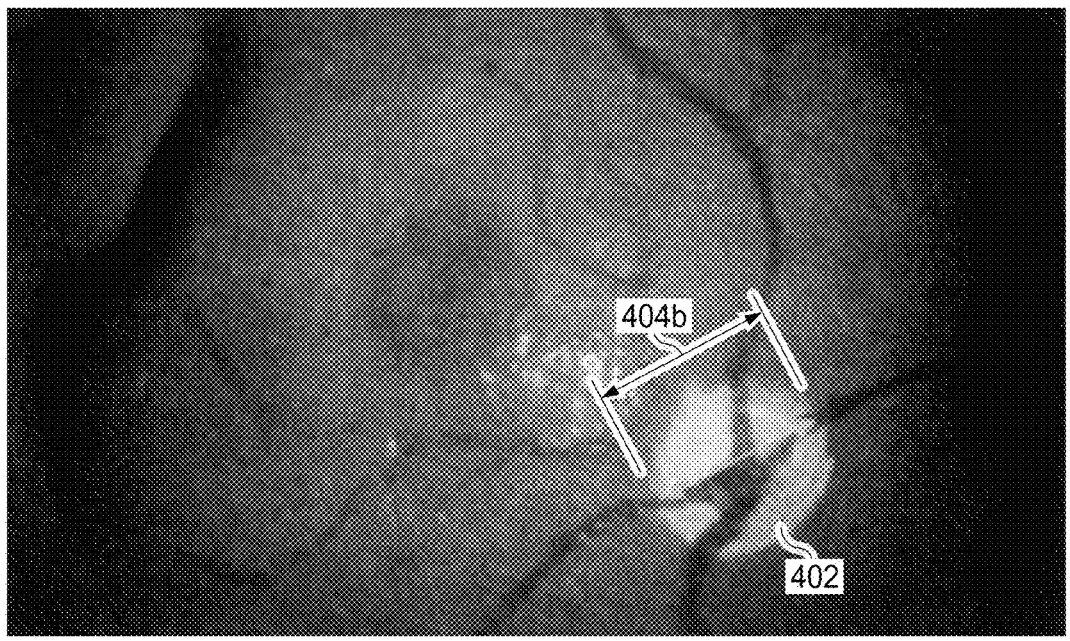
Figure 4C:
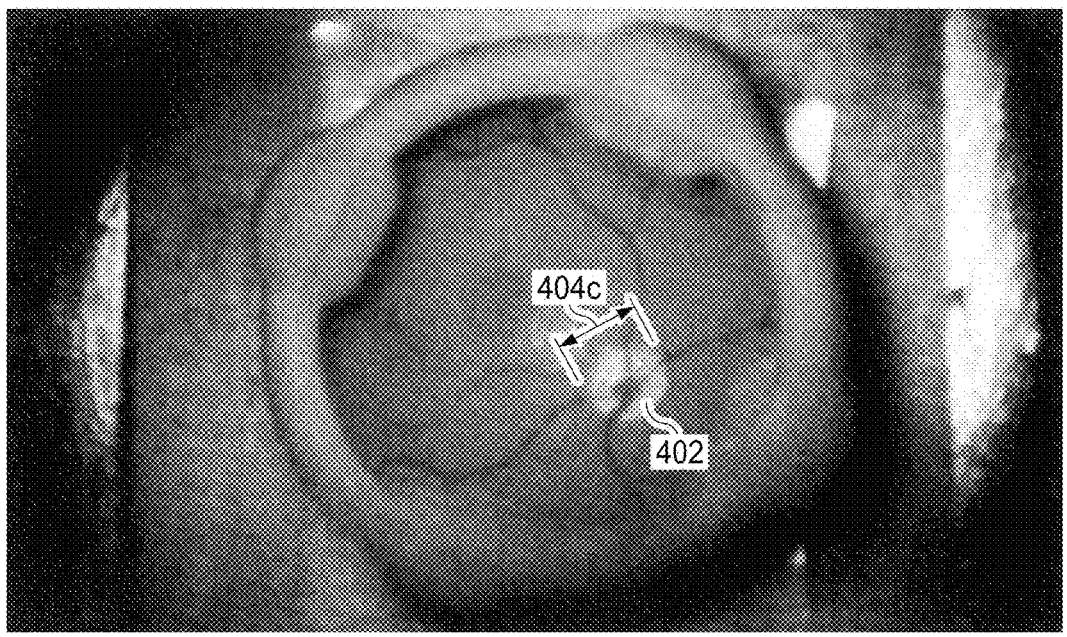

FIGS. 4A-4C are images of an eye at different magnifications. In the example of zoom level extraction calculation illustrated with reference to FIGS. 4A-4C, FIG. 4A is the reference image. FIG. 4A is an image of an eye at a zoom level of 20 times magnification. The zoom level extraction system may select optical nerve head 402 as the common object to use to determine the zoom level in captured images. Optical nerve head 402 may be selected due to the contrast between optical nerve head 402 and the surrounding image. For example, in FIG. 4A, optical nerve head 402 appears as white while the surround image is a dark gray, allowing the zoom level magnification system to easily identify optical nerve head 402 and calculate the size of optical nerve head 402. The zoom level extraction system may calculate the size of optical nerve head 402 by identifying the edges of optical nerve head 402 and calculating the distance between each edge. The zoom level extraction system may measure diameter 404a of optical nerve head 402. For example, in FIG. 4A, diameter 404a is 195 pixels.

FIG. 4B is another image of the eye. The zoom level extraction system may identify optical nerve head 402 in FIG. 4B and measure diameter 404b of optical nerve head 402. In FIG. 4B, diameter 404b is 293 pixels. The zoom level extraction system may then compare the sizes of optical nerve head 402 in FIG. 4B to the reference image of FIG. 4A, using Equation 1, to determine that the zoom level of the image in FIG. 4B is 30.05 times magnification as shown below.

$$\left(\frac{293}{195}\right) \times 20 = 30.05$$

As another example, FIG. 4C is a third image of the eye. The zoom level extraction system may identify optical nerve head 402 in FIG. 4C and measure diameter 404c of optical nerve head 402. In FIG. 4C, diameter 404b is 128 pixels. The zoom level extraction system may then compare the sizes of optical nerve head 402 in FIG. 4C to the reference image of FIG. 4A, using Equation 1, to determine that the zoom level of the image in FIG. 4C is 13.13 times magnification as shown below.

$$\left(\frac{128}{195}\right) \times 20 = 13.13$$

Figure 5:
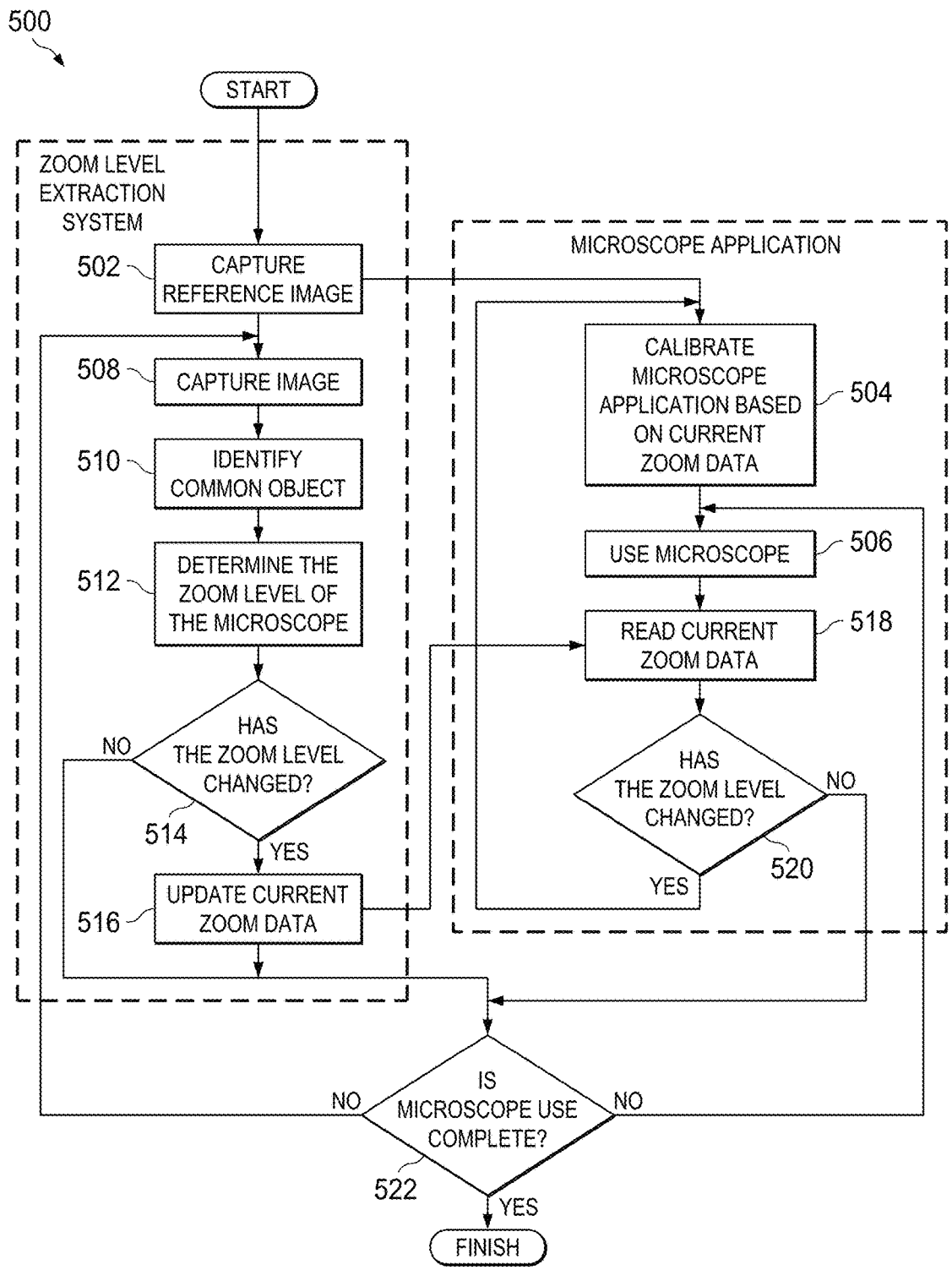
FIG. 5 is a flow chart of a method of integrating a zoom level extraction system with a microscope application.

FIG. 5 is a flow chart of a method of integrating a zoom level extraction system with a microscope application. The steps of method 500 may be performed by a person, various computer programs, models or any combination thereof, configured to control and analyze information from microscope systems, apparatuses and devices. The programs and models may include instructions stored on a computer readable medium and operable to perform, when executed, one or more of the steps described below. The computer readable media may include any system, apparatus or device configured to store and retrieve programs or instructions such as a hard disk drive, a compact disc, flash memory or any other suitable device. The programs and models may be configured to direct a processor or other suitable unit to retrieve and execute the instructions from the computer readable media. For example, the programs and models may be one of the applications in applications 250 shown in FIG. 2. For illustrative purposes, method 500 is described with respect to microscope 100 illustrated in FIG. 1; however, method 500 may be used to determine the current zoom level of any suitable microscope and use the current zoom level in any suitable microscope application, such as microscope application 116 shown in FIG. 1. Many of the steps of method 500 are similar to the steps of method 300 in FIG. 3.

Method 500 may begin at step 502 where the zoom level extraction system may capture a reference image using a camera, such as image sensor 112 shown in FIG. 1. Step 502 may be similar to step 302 in FIG. 3. The zoom level extraction may record the zoom level at which the reference image is captured. The zoom level extraction system may store the captured image and corresponding zoom level in memory, such as memory 240 shown in FIG. 2. The zoom level extraction system may capture any number of reference images.

At step 504, the microscope application may calibration the microscope application based on the current zoom data, such as current zoom data 255 shown in FIG. 2. The calibration method may be specific to the type of microscope application. For example, the microscope application may be a tool tracking application, a digital aiming beam application, a heads-up display application, and/or an adaptive OCT application.

At step 506, the user may use the microscope. During use, the user may change the zoom level. The user may be assisted during use by the microscope application.

At step 508, the zoom level extraction system may capture an image, using the camera, while the microscope is used.

Step 508 may be similar to step 304 in FIG. 3. The zoom level extraction system may capture images periodically according to a sample rate. The sample rate of image capture may change based on any suitable factor including the type of use of the microscope (e.g., a use requiring frequent zoom level changes may result in more frequent image capture), and/or the processing power of the zoom level extraction system (e.g., a system with more processing power may process a higher volume of captured images allowing more frequent image capture), and/or the latency requirement of microscope application 250 (for example, an application with a high latency requirement may require a more frequent image capture).

At step 510, the zoom level extraction system may identify a common object in both the reference image and the captured image. Step 510 may be similar to step 306 in FIG. 3. The common object is an object that is visible in both images. The common object may be any feature in both images and may be easily identifiable.

At step 512, the zoom level extraction system may determine the zoom level of the microscope at which the image was captured in step 304. Step 512 may be similar to step 308 in FIG. 3. The zoom level extraction system may determine the zoom level of the captured image by comparing the captured image to the reference image. The comparison between the two images may be based on identifying the common object in each image, measuring the size of the common object in each image, and comparing the size of the common object to determine the magnification difference using Equation 1. When the zoom level extraction system captures multiple reference images, the zoom level extraction system may use Equation 1 to calculate the zoom level of the captured image with respect to each reference image. The zoom level extraction system may then average the multiple calculated zoom levels of the captured image to determine the zoom level of the captured image. The zoom level extraction system may also use the median value or other statistical value (e.g., 49% percentile, 51% percentile) of the multiple calculated zoom levels of the captured image to determine the zoom level of the captured image. When using multiple reference images, the zoom level extraction system may select the zoom level of the reference image based on the calculations based on the comparison of the reference image with the closest zoom level. Moreover, the zoom level extraction system may perform a weighted average calculation of the multiple calculated zoom levels of the captured image based on the size difference of the common object between captured image and the reference images. Additionally, the zoom level extraction system may use the captured image and the calculated zoom level as reference images for future calculations.

At step 514, the zoom level extraction system may determine whether the zoom level has changed since the last time the zoom level was calculated. Step 514 may be similar to step 310 in FIG. 3. The zoom level extraction system may make this determination by comparing the zoom level calculated in step 512 with the zoom level stored in the current zoom data, such as current zoom data 255 shown in FIG. 2. If the zoom level calculated in step 512 is the same as the current zoom data, method 500 may proceed to step 522 to determine if microscope use is complete. If the zoom level calculated in step 512 is different from the current zoom data, method 500 may proceed to step 516.

At step 516, the zoom level extraction system may store the zoom level calculated in step 512 as the current zoom data. The current zoom data may be stored in a database, such as current zoom data 255 shown in FIG. 2. The current zoom data may be stored in a location accessible by the microscope application.

At step 518, the microscope application may read the current zoom data that the zoom level extraction system stored in step 516. At step 520, the microscope application may use the current zoom data read at step 518 to determine whether the zoom level has changed. The microscope application may make this determination by comparing the zoom level read in step 518 with the zoom level used to calibration the microscope application in step 504. If the zoom level has changed, method 500 may proceed to step 504 to repeat the calibration of the microscope application. If the zoom level has not changed, method 500 may proceed to step 522 where the user continues using the microscope.

At step 522, the zoom level extraction system and/or the microscope application may determine if microscope use is complete. If microscope use is not complete, method 500 may return to step 506 and/or 508 to capture the next image. If microscope use is complete, method 500 may be complete.

Modifications, additions, or omissions may be made to method 500 without departing from the scope of the present disclosure. For example, the order of the steps may be performed in a different manner than that described and some steps may be performed at the same time. Additionally, each individual step may include additional steps without departing from the scope of the present disclosure. For example, the steps performed by the zoom level extraction system, such as steps 502, 508-516, and 522, may be performed while the microscope is in use at step 506 and/or simultaneously with other steps performed by the microscope application, such as steps 504, 506, and 518-522.

The invention claimed is:

1. A method for extracting the zoom level of a microscope, comprising:
   capturing a plurality of reference images;
   recording a first zoom level corresponding to a first magnification at which each reference image is captured;
   capturing a second image;
   determining a second zoom level by comparing the second image and each reference image and by using a common object of each reference image and the second image, the second zoom level corresponding to a second magnification at which the second image is captured, the determining the second zoom level comprising:
   measuring a first size of the common object in each of the plurality of reference images;
   measuring a second size of the common object in the second image;
   selecting one of the plurality of reference images where the first size of the common object is closest to the second size of the common object; and
   determining the second zoom level based on the difference in the first size of the common object in the selected one of the plurality of reference images and the second size; and
   recording the second zoom level at a location accessible by a microscope application.

2. The method of claim 1, wherein the common object contrasts with a surrounding portion of at least one of a reference image of the plurality of reference images and the second image.

3. The method of claim 1, further comprising storing the second image as an additional reference image.

4. The method of claim 1, wherein each reference image is captured at a predetermined zoom level.

5. A method for extracting the zoom level of a microscope, comprising:
capturing a plurality of reference images;
recording a first zoom level corresponding to a first magnification at which each reference image is captured;
capturing a second image;
determining a second zoom level by comparing the second image and each reference image and by using a common object of each reference image and the second image, the second zoom level corresponding to a second magnification at which the second image is captured, the determining the second zoom level comprising:
identifying a common object in each of the plurality of reference images and the second image;
measuring a size of the common object in each of the plurality of reference images;
measuring a second size of the common object in the second image;
determining a plurality of relative second zoom levels based on the difference in the size of the common object in each of the plurality of reference images and the second size; and
averaging the plurality of relative second zoom levels to determine the second zoom level; and
recording the second zoom level at a location accessible by a microscope application.

6. The method of claim 5, wherein averaging the plurality of relative second zoom levels to determine the second zoom level includes performing a weighted average calculation of the plurality of relative second zoom levels to determine the second zoom level.

7. A method for extracting the zoom level of a microscope, comprising:
capturing a plurality of reference images;
recording a first zoom level corresponding to a first magnification at which each reference image is captured;
capturing a second image;
determining a second zoom level by comparing the second image and each reference image and by using a common object of each reference image and the second image, the second zoom level corresponding to a second magnification at which the second image is captured, the determining the second zoom level comprising:
identifying a common object in each of the plurality of reference images and the second image;
measuring a size of the common object in each of the plurality of reference images;
measuring a second size of the common object in the second image;
determining a plurality of relative second zoom levels based on the difference in the size of the common object in each of the plurality of reference images and the second size; and
using the median value of the plurality of relative second zoom levels to determine the second zoom level; and
recording the second zoom level at a location accessible by a microscope application.

8. A system for extracting the zoom level of a microscope, comprising:
a processor;
a non-transitory machine-readable medium communicatively coupled to the processor; and
instructions stored on the non-transitory machine-readable medium, the instructions, when loaded and executed by the processor, cause the processor to:
capture a plurality of reference images;
record a first zoom level corresponding to a first magnification at which each reference image is captured;
capture a second image;
determine a second zoom level by comparing the second image and each reference image and by using a common object of each reference image and the second image, the second zoom level corresponding to a second magnification at which the second image is captured, the determining the second zoom level comprising:
measuring a first size of the common object in each of the plurality of reference images;
measuring a second size of the common object in the second image;
selecting one of the plurality of reference images where the first size of the common object is closest to the second size of the common object; and
determining the second zoom level based on the difference in the first size of the common object in the selected one of the plurality of reference images and the second size; and
record the second zoom level at a location accessible by a microscope application.

9. The system of claim 8, wherein the common object contrasts with a surrounding portion of at least one of a reference image of the plurality of reference images and the second image.

10. The system of claim 8, the instructions further configured to store the second image as an additional reference image.

11. The system of claim 8, wherein each reference image is captured at a predetermined zoom level.

12. A system for extracting the zoom level of a microscope, comprising:
a processor;
a non-transitory machine-readable medium communicatively coupled to the processor; and
instructions stored on the non-transitory machine-readable medium, the instructions, when loaded and executed by the processor, cause the processor to:
capture a plurality of reference images;
record a first zoom level corresponding to a first magnification at which each reference image is captured;
capture a second image;
determine a second zoom level by comparing the second image and each reference image and by using a common object of each reference image and the second image, the second zoom level corresponding to a second magnification at which the second image is captured, the determining the second zoom level comprising:
identifying a common object in each of the plurality of reference images and the second image;
measuring a size of the common object in each of the plurality of reference images;
measuring a second size of the common object in the second image;
determining a plurality of relative second zoom levels based on the difference in the size of the common object in each of the plurality of reference images and the second size; and
averaging the plurality of relative second zoom levels to determine the second zoom level; and
record the second zoom level at a location accessible by a microscope application.

13. The system of claim 12, wherein averaging the plurality of relative second zoom levels to determine the second zoom level includes performing a weighted average calculation of the plurality of relative second zoom levels to determine the second zoom level.

14. A system for extracting the zoom level of a microscope, comprising:
a processor;
a non-transitory machine-readable medium communicatively coupled to the processor; and
instructions stored on the non-transitory machine-readable medium, the instructions, when loaded and executed by the processor, cause the processor to:
capture a plurality of reference images;
record a first zoom level corresponding to a first magnification at which each reference image is captured;
capture a second image;
determine a second zoom level by comparing the second image and each reference image and by using a common object of each reference image and the second image, the second zoom level corresponding to a second magnification at which the second image is captured, the determining the second zoom level comprising:
identifying a common object in each of the plurality of reference images and the second image;
measuring a size of the common object in each of the plurality of reference images;
measuring a second size of the common object in the second image;
determining a plurality of relative second zoom levels based on the difference in the size of the common object in each of the plurality of reference images and the second size; and
using the median value of the plurality of relative second zoom levels to determine the second zoom level; and
record the second zoom level at a location accessible by a microscope application.

15. A microscope, comprising:
an eyepiece;
an objective lens optically coupled to the eyepiece; and
a zoom level extraction system for extracting the zoom level of the objective lens, the zoom level extraction system including:
a processor;
a non-transitory machine-readable medium communicatively coupled to the processor; and
instructions stored on the non-transitory machine-readable medium, the instructions, when loaded and executed by the processor, cause the processor to:
capture a plurality of reference images;
record a first zoom level corresponding to a first magnification at which the reference image is captured;
capture a second image;
determine a second zoom level by comparing the second image and the reference image and by using a common object of each reference image and the second image, the second zoom level corresponding to a second magnification at which the second image is captured, the determining the second zoom level comprising:
measuring a first size of the common object in each of the plurality of reference images;
measuring a second size of the common object in the second image;
selecting one of the plurality of reference images where the first size of the common object is closest to the second size of the common object; and
determining the second zoom level based on the difference in the first size of the common object in the selected one of the plurality of reference images and the second size; and
record the second zoom level at a location accessible by a microscope application.

16. A microscope, comprising:
an eyepiece;
an objective lens optically coupled to the eyepiece; and
a zoom level extraction system for extracting the zoom level of the objective lens, the zoom level extraction system including:
a processor;
a non-transitory machine-readable medium communicatively coupled to the processor; and
instructions stored on the non-transitory machine-readable medium, the instructions, when loaded and executed by the processor, cause the processor to:
capture a plurality of reference images;
record a first zoom level corresponding to a first magnification at which the reference image is captured;
capture a second image;
determine a second zoom level by comparing the second image and the reference image and by using a common object of each reference image and the second image, the second zoom level corresponding to a second magnification at which the second image is captured, the determining the second zoom level comprising:
identifying a common object in each of the plurality of reference images and the second image;
measuring a size of the common object in each of the plurality of reference images;
measuring a second size of the common object in the second image;
determining a plurality of relative second zoom levels based on the difference in the size of the common object in each of the plurality of reference images and the second size; and
averaging the plurality of relative second zoom levels to determine the second zoom level; and
record the second zoom level at a location accessible by a microscope application.

17. The microscope of claim 16, wherein averaging the plurality of relative second zoom levels to determine the second zoom level includes performing a weighted average calculation of the plurality of relative second zoom levels to determine the second zoom level.

18. A microscope, comprising:
an eyepiece;
an objective lens optically coupled to the eyepiece; and
a zoom level extraction system for extracting the zoom level of the objective lens, the zoom level extraction system including:
a processor;

a non-transitory machine-readable medium communicatively coupled to the processor; and instructions stored on the non-transitory machine-readable medium, the instructions, when loaded and executed by the processor, cause the processor to:

capture a plurality of reference images;

record a first zoom level corresponding to a first magnification at which the reference image is captured;

capture a second image;

determine a second zoom level by comparing the second image and the reference image and by using a common object of each reference image and the second image, the second zoom level corresponding to a second magnification at which the second image is captured, the determining the second zoom level comprising:

identifying a common object in each of the plurality of reference images and the second image;

measuring a size of the common object in each of the plurality of reference images;

measuring a second size of the common object in the second image;

determining a plurality of relative second zoom levels based on the difference in the size of the common object in each of the plurality of reference images and the second size; and using the median value of the plurality of relative second zoom levels to determine the second zoom level; and record the second zoom level at a location accessible by a microscope application.

\* \* \* \* \*